UNITED STATES PATENT OFFICE.

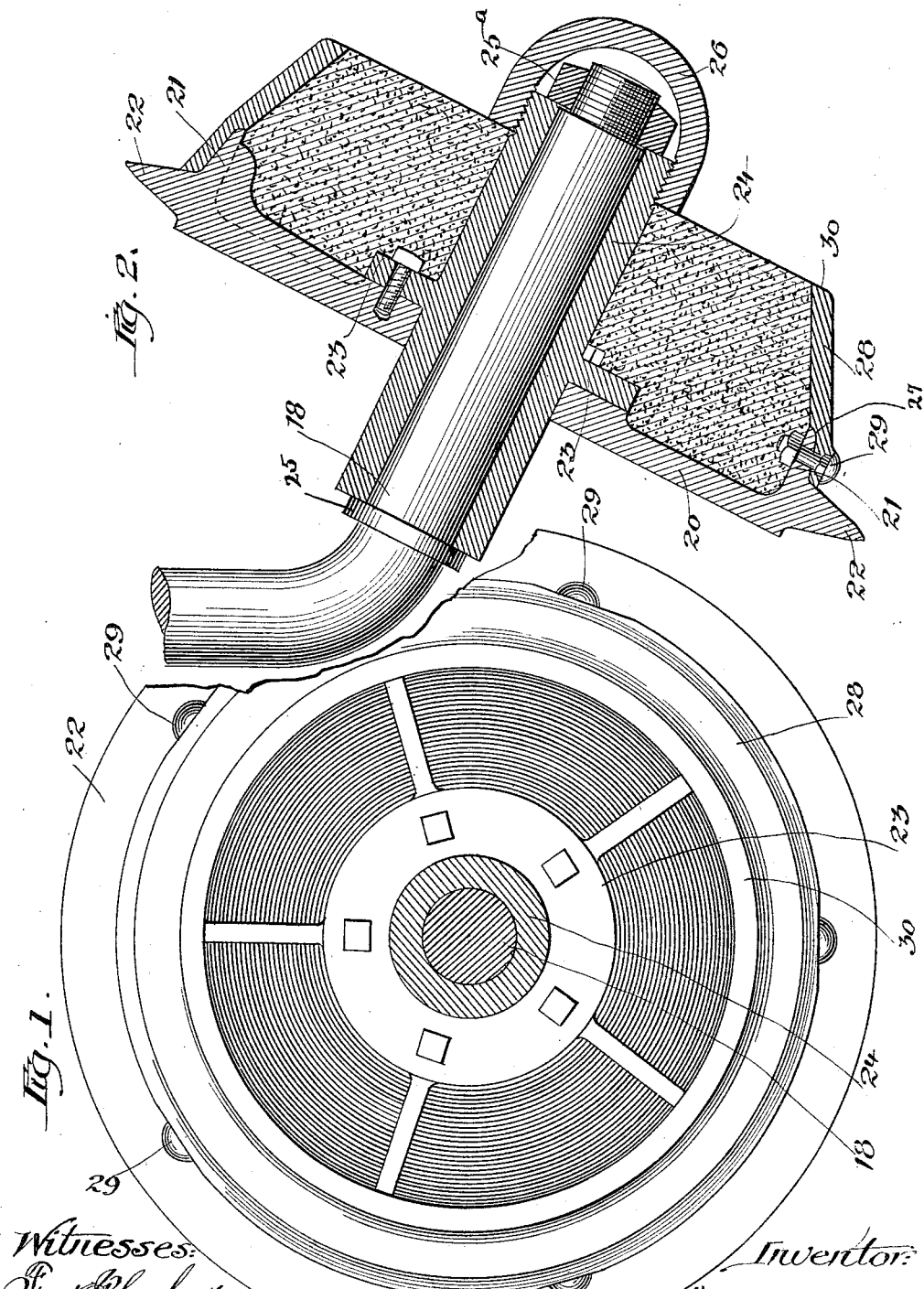

HARRY J. HIRSHHEIMER, OF LA CROSSE, WISCONSIN, ASSIGNOR TO LA CROSSE PLOW COMPANY, OF LA CROSSE, WISCONSIN, A CORPORATION OF WISCONSIN.

WHEELED PLOW.

1,130,732. Specification of Letters Patent. Patented Mar. 9, 1915.

Application filed August 22, 1912. Serial No. 716,371.

*To all whom it may concern:*

Be it known that I, HARRY J. HIRSHHEIMER, a resident of La Crosse, in the county of La Crosse and State of Wisconsin, have invented certain new and useful Improvements in Wheeled Plows, of which the following is a full, clear, and exact description.

The invention relates to wheeled plows, and more particularly to carrying-wheels for such plows.

An object of the invention is to provide wheels which are adapted to support the plow in soft ground, as well as hard ground and which are adapted to hold the plow against side-thrust or pressure resulting from the plows. In practice, it has been found that furrow-wheels in disk-plows, which are usually angled to counteract the pressure of the land against the disks, and which are provided with a peripheral flange for this purpose, are insufficient to prevent the wheels from cutting too deep when the soil is soft or sandy.

The present invention designs to provide plow-wheels with a removable rim or extension, which, when the plow is being used in hard ground, will not increase the draft of the plow, and which, will serve to effectively sustain the plow in the soft soil.

The invention also designs to provide a removable rim or extension for each wheel, so that it can be removed, if the character of the soil being plowed, should make it desirable.

A further object of the invention is to provide an improved plow-wheel which is formed so it may be packed with clay or other plastic material to weight the wheels when that is necessary or desirable to hold the plow down.

The invention consists in the novel features hereinafter set forth and more particularly defined by claims at the conclusion hereof.

In the drawings: Figure 1 is a face view of a plow embodying the invention. Fig. 2 is a central vertical section.

The improved wheel comprises a solid body 20, a tread or flange 21, and a flange 22 all integrally formed. Body 20 is bolted to a flange 23 on a collar or hub which is journaled on spindle 18, and held thereon by a collar 25 and a nut 25ᵃ on the screw-threaded terminal of spindle 18. A cap 26 is screw-threaded to one end of sleeve 24. Flange 22 is disposed at one side of the tread and the laterally projecting flange or tread 21 is formed to fit in an annular recess or seat 27 in a ring or rim-extension 28 which is adapted to be secured to tread 21 by bolts 29. Extension-rim 28 has a portion 30 which is conoidal or tapered and extends inwardly from the tread 21 to provide a surface which will be approximately parallel to the bottom of the furrow and will rest on soft soil to support the plow and prevent the flange 22 from cutting too deeply into the soil. By providing a conoidal rim-extension, which is adapted to rest substantially flatwise on the bottom of the furrow, the cutting of the flange 22 into soft soil is effectively prevented. The spindle for each furrow-wheel is usually inclined outwardly and downwardly so that the wheel will rotate in a plane inclined to the vertical to better resist side-pressure toward "land". The tread portion of extension 28 is tapered to approximately conform to that portion of the furrow-bottom on which the extension travels, and so that the tread will not have material bearing on the ground in hard ground and retard the draft of the plow. Furthermore, this extension does not necessitate change in the angle of the axle. This ring 28 is removably connected to the body of the wheel 20 by bolts 29, so that the plow may be removed to permit the flange 22 unrestricted freedom in cutting, if desired. The improved wheel-construction may be used, when the plow is being used in very soft soil, as a land wheel. The wheel is reversible, or it may be connected to the spindles so that the extension rim will be on the inside or the outside when used as a land-wheel. In some soils, it is desirable to weight down the plow to hold the plows in the ground. By providing a solid body and this extension, clay or other plastic material may be readily packed into the wheel, as indicated in dotted lines, and thus the necessary weight may be added to hold the plow in the ground.

The invention is not to be restricted to the details set forth, since these may be modified within the scope of the appended claims without departing from the spirit and scope of the invention.

Having thus described the invention, what I claim as new and desire to secure by Letters Patent, is:

1. A plow wheel having a body, an outwardly extending flange and a tread integral with said flange, an extension rim fitting on the periphery of the tread and having its periphery tapered and extending inwardly from that of the tread and means extending through the tread-flange and said rim for removably securing the extension rim on the wheel.

2. A plow-wheel having a body, a tread and an outwardly extending flange at one side of the tread, and an extension rim removably secured to said tread and being provided with a tapered portion to project from the other side of the tread.

3. A plow-wheel having a body, a tread and an outwardly extending flange, an extension rim having an annular seat fitting around the tread of the wheel, and a laterally extending tapered portion, and bolts extending through said extension and the tread of the wheel for securing the extension on the rim.

4. A plow wheel having a body, a tread and an outwardly extending flange, at one side of the tread, an extension rim having an annular seat fitting around the tread of the wheel, and a laterally extending tapered portion, and bolts extending through said extension and the tread of the wheel for securing the extension on the rim.

5. A plow-wheel having a hub, a solid wall, a tread at one side thereof and an extension rim having its inner periphery tapered from the tread laterally and toward the axis of the wheel to retain a plastic filling adjacent said wall.

HARRY J. HIRSHHEIMER.

Witnesses:
E. S. Case,
C. F. Sutor.

Copies of this patent may be obtained for five cents each, by addressing the "Commissioner of Patents, Washington, D. C."